US012012312B2

(12) United States Patent
Wiest et al.

(10) Patent No.: US 12,012,312 B2
(45) Date of Patent: Jun. 18, 2024

(54) CRANE

(71) Applicant: Liebherr-Werk Biberach GmbH, Biberach an der Riss (DE)

(72) Inventors: Florian Wiest, Leutkirch (DE); Philip Irle, Tübingen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 0 days.

(21) Appl. No.: 18/066,877

(22) Filed: Dec. 15, 2022

(65) Prior Publication Data

US 2023/0117650 A1 Apr. 20, 2023

Related U.S. Application Data

(63) Continuation of application No. 17/071,460, filed on Oct. 15, 2020, now Pat. No. 11,577,940, which is a continuation of application No. PCT/EP2019/060426, filed on Apr. 24, 2019.

(30) Foreign Application Priority Data

Apr. 26, 2018 (DE) ..................... 10 2018 110 058.2

(51) Int. Cl.
*B66C 13/14* (2006.01)
*B66C 23/02* (2006.01)
*B66C 23/26* (2006.01)

(52) U.S. Cl.
CPC .............. *B66C 23/02* (2013.01); *B66C 13/14* (2013.01); *B66C 23/26* (2013.01)

(58) Field of Classification Search
CPC ...................................................... B66C 13/14
See application file for complete search history.

(56) References Cited

U.S. PATENT DOCUMENTS

| | | | | |
|---|---|---|---|---|
| 5,071,184 | A | 12/1991 | Dessaux | |
| 10,017,362 | B2 * | 7/2018 | Mesiä | H02J 7/35 |
| 11,577,940 | B2 | 2/2023 | Wiest et al. | |
| 2015/0123476 | A1 * | 5/2015 | Mesia | H02K 7/1853 307/29 |
| 2016/0083229 | A1 | 3/2016 | Assfalg et al. | |

(Continued)

FOREIGN PATENT DOCUMENTS

| | | | |
|---|---|---|---|
| CN | 200954847 | Y | 10/2007 |
| CN | 101423081 | | 5/2009 |
| CN | 201733402 | | 2/2011 |

(Continued)

*Primary Examiner* — Michael R Mansen
*Assistant Examiner* — Juan J Campos, Jr.
(74) *Attorney, Agent, or Firm* — Levine Bagade Han LLP

(57) ABSTRACT

The invention relates to a crane, in particular a rotary tower crane, comprising a crane boom, from which a load hook can be raised and lowered via a hoist cable, and an electric power supply on the load hook and/or an optionally provided trolley which can be moved on the crane boom. According to the invention, the electric power is directly generated at the location where it is required, and in the process kinetic energy present at said location is converted into power. According to the invention, the electric power supply comprises a generator which is arranged on the load hook and/or on the trolley and which can be driven by a deflecting and/or running pulley and/or a cable running around the deflecting pulley.

6 Claims, 10 Drawing Sheets

(56) References Cited

U.S. PATENT DOCUMENTS

| | | | |
|---|---|---|---|
| 2021/0094805 A1 | 4/2021 | Wiest et al. | |

FOREIGN PATENT DOCUMENTS

| | | | |
|---|---|---|---|
| CN | 202110060 | U | 1/2012 |
| CN | 203699752 | | 7/2014 |
| DE | 69000566 | | 6/1993 |
| DE | 102008032603 | | 1/2010 |
| DE | 102012204942 | | 10/2013 |
| DE | 112013002210 | T5 | 10/2013 |
| DE | 102014117098 | | 5/2016 |
| EP | 3178772 | | 6/2017 |
| WO | WO 2013/160548 | | 10/2013 |
| WO | WO 2019/206936 | | 10/2019 |

* cited by examiner

CRANE

CROSS-REFERENCE TO RELATED APPLICATIONS

This application is a continuation of U.S. patent application Ser. No. 17/071,460 filed Oct. 15, 2020, which is a continuation of International Patent Application Number PCT/EP2019/060426 filed Apr. 24, 2019, which claims priority to German Patent Application Number DE 10 2018 110 058.2 filed Apr. 26, 2018, the contents of which are incorporated herein by reference in their entireties.

BACKGROUND

The present invention relates to a crane, in particular to a revolving tower crane, comprising a crane boom from which a lifting hook can be raised and lowered via a hoist rope and an electric power supply at the lifting hook and/or an optionally present trolley travelable at the crane boom.

It is necessary or at least helpful for certain lifting work to have an electric power connection available at the whippletree or lifting hook, for example to be able to operate electric lifting solenoids for magnetic lifting work or also to be able to use cameras, sensors, or other attachment devices having, for example, electrical actuating motors at the lifting hook. If the crane has a trolley at the boom, as is the case with revolving tower cranes, for example, it is sometimes also necessary or helpful to have a power connection at the trolley, either to be able to transfer the power from the trolley via a spring cable reel to the lifting hook or also to be able to electrically feed other consumers at the trolley, for example headlamps, cameras, sensors, or other electric devices.

It has already been proposed for the electrical supply of a power connection at the trolley and/or at the lifting hook to first transport electric energy up to the trolley with the aid of trailing lines and to transmit it onward further down to the lifting hook with the aid of spring cable reels. Such an installation of trailing lines and spring cable reels at the boom is, however, very bulky and is per se only suitable for cranes that are installed as stationary and where space requirements and ease of installation do not play any greater role. With fast-erecting cranes or so-called taxi cranes that are frequently set up and dismantled daily or even several times a day and only rarely weekly, the ease of installation and the folding work for road transport for the transport by road and also the weight problems at the boom are of great importance. With such fast-installation or fast-erecting cranes, the named solutions are unsatisfactory for the electrical supply of a consumer at the trolley or at the lifting hook.

It is further known from EP 3 178 772 A1 to conduct electric power over the electrically conductive trolley cable to the trolley and to conduct it to the lifting hook over the electrically. conductive hoist rope. Electrical conductors are embedded in the cable core in the trolley cable and in the hoist rope for this purpose and are surrounded by a plurality of outer strands that serve as ground wires. Such a power transmission over the load-carrying ropes admittedly avoids separate trailing lines and spring cable reels; on the other hand, conventional, non-insulated steel wire ropes cannot be used.

It is therefore the underlying object of the present invention to provide an improved crane of the initially named kind which avoids disadvantages of the prior art and further develops the latter in an advantageous manner. Electric energy should in particular be provided in a simple and efficient manner at the lifting hook and/or at the trolley of the crane without impairing the ease of installation, taking up excessive space requirements at the boom, or requiring complex rope designs.

SUMMARY

The named object is achieved in accordance with the invention by a crane in accordance with claim 1. Preferred embodiments of the invention are the subject of the dependent claims.

It is therefore proposed to generate the electric power directly where it is required and in so doing to convert kinetic energy present there into electricity. In accordance with the invention, the electric power supply comprises a generator that is arranged at the lifting hook and/or at the trolley and that is drivable by a deflection pulley and/or a roller and/or by the rope running around the deflection pulley. Additional power lines or power lines laboriously integrated into ropes bearing the load can be avoided by such a generator seated at the pulley block of the lifting hook or at the trolley since the generator generates and provides the electric power directly at the lifting hook and/or at the trolley.

Depending on the consumer to be fed, the power provided by the generator can be provided directly to the consumer, optionally fed via power electronics and/or feed electronics and/or control electronics and/or at least partially into an electrical store acting as a buffer from which the stored energy is then passed to the consumer. Such an electrical buffer can, for example, be a secondary cell or a primary cell, or also a capacitor or can comprise such modules.

A direct energy feed without a buffer is suitable, for example, for consumers that only require the power when the lifting hook and/or the trolley move. Such consumers can, for example, be sensors that are intended to detect the travel path. An energy supply using a buffer can be advantageous, however, if consumers are to be fed that also require electric energy when the trolley and/or lifting hook is/are stationary. They can, for example, likewise be sensors, but also actuators, communication modules, or processors that control a corresponding actuator element or sensor element or communication device.

If at least some of the electric energy provided by the generator is fed into the electrical buffer, the feed can be controlled by power electronics for charging and/or discharging the energy store. Such power electronics and/or feed electronics and/or discharge electronics can protect the buffer from overcharging and can supply consumers fed from the buffer evenly with power, with optionally the charge state of the buffer being able to be considered during its charging or discharging.

In an advantageous further development of the invention, the electric power generated by the generator can be used with or without a buffer to supply at least one sensor and a communication module connected thereto for transmitting a sensor signal. In an advantageous further development of the invention, the sensor signal can be wirelessly transmitted from the communication module to a control device or a control apparatus, with different wireless transmission formats being able to be used. The sensor signal can in particular be transmitted by radio, with in this case the communication module comprising a radio module.

If the generator is arranged at the lifting hook, the rotary movement of a deflection pulley about which the hoist rope is deflected and/or the rope movement of the hoist rope relative to the lifting hook can be used to drive the generator. The generator can be driven by the rotary movement of the deflection pulley and/or by the travel movement of the hoist rope.

If the generator—or a further generator—is arranged at the trolley, the generator can be driven by the rotary movement of a roller by which the trolley is guided at the boom and that rotates on movements of the trolley. Alternatively or additionally, such a generator arranged at the trolley can also be driven by a deflection pulley about which the hoist rope running off from the trolley is deflected or also—depending on the rope guidance—about which a trolley cable is deflected. Alternatively or additionally, a generator provided at the trolley can also be driven by a rope that runs past the trolley, that is by its rope movement, for example by the hoist rope running off from the trolley or by a run of the trolley cable running past the trolley.

A generator arranged at the trolley can advantageously also be driven in a hybrid manner, that is selectively or additionally both by the hoist rope running off from the trolley and/or by a deflection pulley that runs around the hoist rope and that is rotatably supported at the trolley and by a roller that guides the trolley at the boom and/or by the trolley rope. For this purpose, the generator can be drivable via a free-wheel device and/or clutch device by two drive strands or by two drive wheels or drive shafts to be able to tap, on the one hand, a travel movement of the trolley and, on the other hand, a lifting or lowering movement of the hoist rope and to be able to convert electric energy. With such a dual drivability, the generator can provide energy with a stationary trolley when the hoist rope is let down or raised and can likewise provide energy on a travel of the trolley even if the hoist rope is not raised and is not lowered.

To be able to use the rotary movement of a deflection pulley and/or roller to drive the generator, said deflection pulley or roller can comprise a roller axle that co-rotates with the roller and that is rotatably supported at the roller carrier—for example a hook block housing or hook block carrier or the trolley frame. The co-rotating roller axles can directly drive the generator, with the generator shaft being seated, for example, directly on said roller axle and/or being able to be rigidly and/or at least rotationally fixedly connected thereto and/or being able to be formed integrally in one piece therewith. Alternatively, the rotary movement of said roller axle can also be transmitted via a transmission section to the generator, for example in the form of a spur gear section or a planetary transmission section that steps the roller rotation up or down into a generator rotation.

The deflection pulley or roller does not, however, have to have such a co-rotating roller axle, but can also be rotatably supported at a perpendicular axle. Independently of this, the roller body or its rotary movement can serve as a drive for the generator.

A ring gear and/or a friction track can in particular be rotationally fixedly arranged at the roller body and can co-rotate with the roller body, with the generator or a transmission section connected thereto being able to have a drive wheel that meshes with said ring gear or rolls off on the friction track.

Said ring gear or said friction track can advantageously be provided or formed at a bearing flange and/or at a rope guidance flange. Such a bearing flange and such a rope guidance flange are typically thickened in comparison with the roller body present therebetween so that sufficient substance is present for the formation or fastening of the ring gears or of the friction track. Depending on the desired step up or step down ratio, the relatively larger diameter of the rope deflection flange or the relatively smaller diameter of the bearing flange of the roller body can be preferred.

To have a particularly space saving construction, the drive shaft meshing with the ring gear or rolling off on the friction track can be arranged for the driving of the generator between said bearing flange and said rope deflection flange of the roller body and/or can have a rotary axle that is substantially arranged in parallel with or only inclined at a small angle to the rotational axle of the deflection pulley or roller. Said drive wheel can in particular be arranged at least partially in the annular pocket of the roller body between its bearing flange and its outer flange and/or in at least partially overlapping in a radial direction, that is within the width of the bearing flange and/or of the outer flange of the deflection pulley or roller.

The drive wheel tapping the drive movement of the deflection pulley or roller can, however, generally also be arranged in a different manner, for example with a rotational axle aligned radially with the roller axle of rotation as is the case with bevel wheel sections.

If the deflection pulley or the roller is rotatably supported by at least one roller bearing, the generator or at least a drive wheel driving the generator can be associated with said roller bearing, in particular integrated in said roller bearing.

Such a design of the generator associated with the roller bearing can be achieved, for example, in that the roller bearing ring co-rotated with the roller body is connected to a ring gear and/or comprises a friction track with which the drive wheel at the generator side is in roller engagement.

The generator can also be directly integrated in said roller bearing, for example in that primary and secondary coils or an induction coil and a magnet or a magnetic coil is/are attached to the two mutually rotatable roller bearing rings. In this respect, the coil in which the electric power is induced can advantageously be associated with the stationary roller bearing ring while the rotor is associated with the rotating roller bearing ring.

Roller bodies that are conventional per se can be used by integrating the generator or generator parts into the roller bearing by which a deflection pulley or a roller is rotatably supported. The roller bearing with the generator integrated therein can form an independent, preassembled assembly by means of which a conventional roller or a conventional deflection pulley is rotatably supported.

Alternatively or additionally to a driving of the generator from the roller bearing or from the roller body of the deflection pulley or of the roller, the generator can also have a rope contact wheel that serves as a drive wheel and runs off directly on the rope so that the rope running past drives the generator. Said rope contact wheel can here be directly attached to the generator shaft, but can optionally also be connected to the generator via a transmission section.

In an advantageous further development of the invention, said rope contact wheel can form a friction wheel that is driven by the running rope via friction.

To save space and to achieve a compact arrangement, said rope contact wheel can be arranged at the circumference of a deflection pulley and can contact a rope section that is deflected about the deflection pulley or is in contact with the deflection pulley. On the one hand, it can hereby be prevented that the rope evades the rope contact wheel since it is supported by the circumferential surface of the deflection pulley. On the other hand, the rope contact roller can be simply supported, in particular at the carrier at which the deflection pulley is also rotatably supported.

Alternatively or additionally, however, a rope contact wheel can also be provided that contacts a free rope section running off from the deflection pulley or running onto it.

To achieve sufficient friction forces that allow the rope contact wheel to reliably rotate and roll off on the rope, the rope contact wheel can be tensioned toward the rope by means of a preload device, in particular in a direction transversely to the longitudinal rope direction. Such a preload device can, for example, comprise a spring device that presses or pulls the rope contact wheel with spring force with respect to the rope.

Such a preload device can be supported here in an advantageous further development of the invention at the deflection pulley carrier at which the deflection pulley is also supported. Alternatively or additionally, however, a support for the preload device can also be provided at the rope itself, for example in that two rope contact rollers contact the rope from opposite sides and are preloaded with respect to one another.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
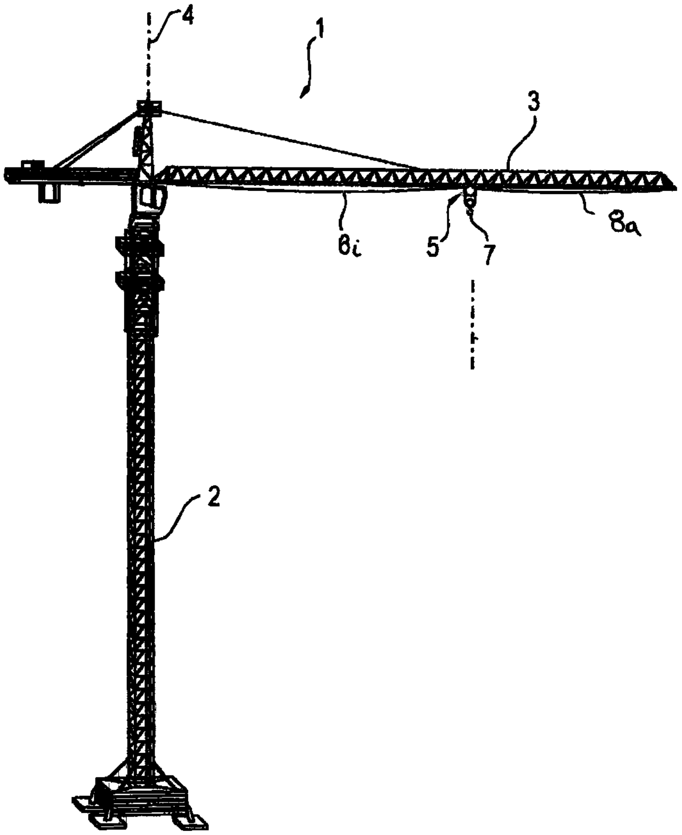
FIG. 1: a schematic side view of a crane that is configured as a revolving tower crane in accordance with an embodiment of the invention and has a boom along which a trolley is travelable from which a lifting hook can be lowered via a hoist rope.

As FIG. 1 shows, the crane 1 can be configured as a revolving tower crane and can comprise a tower 2 that bears a projecting boom 3. The crane can be a top-slewer with which the boom 3 is rotatable relative to the tower 2 or the lower end of the tower 2 can be seated on a slewing platform that is rotatable about an upright axis and that is supported on an undercarriage that can be formed as a truck or that is travelable in a different manner, but can optionally also form a rigid, non-travelable support base.

The boom 3 can be tensioned via a guying, with the guying optionally being able to be adjustable to be able to luff the boom 3 up and down.

The crane 1 can also be formed as a fast-erecting crane whose tower 2 can be able to be telescoped and whose boom 3 can be able to be folded together and/or telescoped so that the tower and the boom can be folded to form a transport package able to be transported by road.

As FIG. 1 shows, a trolley 5 can be supported in a longitudinally travelable manner at the boom 3, said trolley 5 being able to be traveled to and fro by means of a trolley cable 8. An inner trolley cable 8 leads from the trolley via a deflection pulley at the inner end section of the boom 3 close to the tower to a trolley winch 9, while an outer trolley cable **8*a* leads from the trolley 7 via a deflection pulley at the outer end section of the boom 3 to said trolley winch 9**.

Figure 2:
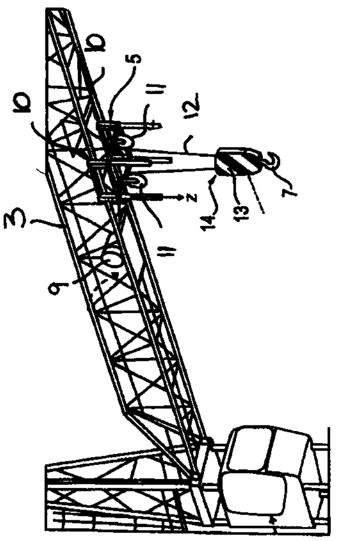
FIG. 2: a sectional, perspective representation of the boom of the crane of FIG. 1 at which a trolley is shown from which the hoist rope with the lifting hook lashed thereto runs off.

As FIG. 2 shows, said trolley 5 is longitudinally travelably guided and supported via rollers 10 at the boom 3, with said boom 3, for example, having tracks for said rollers 10 at its lower webs.

As FIG. 2 further shows, deflection pulleys 11 can be provided at the trolley 5 about which a hoist rope 12 is deflected to which a lifting hook 7 is lashed. Said hoist rope 12 can here, for example, be lashed to the boom tip and can be wound onto a hoist rope winch at the inner end of the boom 3 or at the counterboom to be able to lower and raise up the hoist rope 12 from the trolley 5.

The hoist rope 12 here runs at the hook side about a deflection pulley 13 that is rotatably fastened to a pulley block carrier 14 that carries said lifting hook 7.

As FIGS. 3 to 10 show, a generator 15 can be arranged at said lifting hook 7 or at the pulley block carrier 14 connected thereto to be able to generate electric power at the lifting hook 7, with said generator 15 advantageously being able to be driven by the deflection pulley 13, by the hoist rope 6 deflected about the deflection pulley 13, or by a roller bearing rotatably supporting the deflection pulley 13, as will be explained in more detail below.

To balance any possible imbalance, a counterweight can be attached on the side of the hook block disposed opposite the generator.

In a corresponding manner, such a generator 15 can also be provided at the trolley 5, with this generator 15 at the trolley side being able to be driven in an analog manner by one of the deflection pulleys 11 provided there, by one of the rollers 10, or by a roller bearing by means of which the deflection pulley 11 or the roller 10 is rotatably supported at the frame of the trolley 5. Only the drive mechanism at the deflection pulley 13 at the lifting hook 7, at the roller bearing provided there and at the hoist rope 6 deflected there will be explained in the following. It is, however, understood that the drive mechanism at the trolley side can be formed in a very analogous corresponding manner at said deflection pulley there, at said roller bearing there, or at said deflected hoist rope or at the trolley cable running past there.

Figure 3:
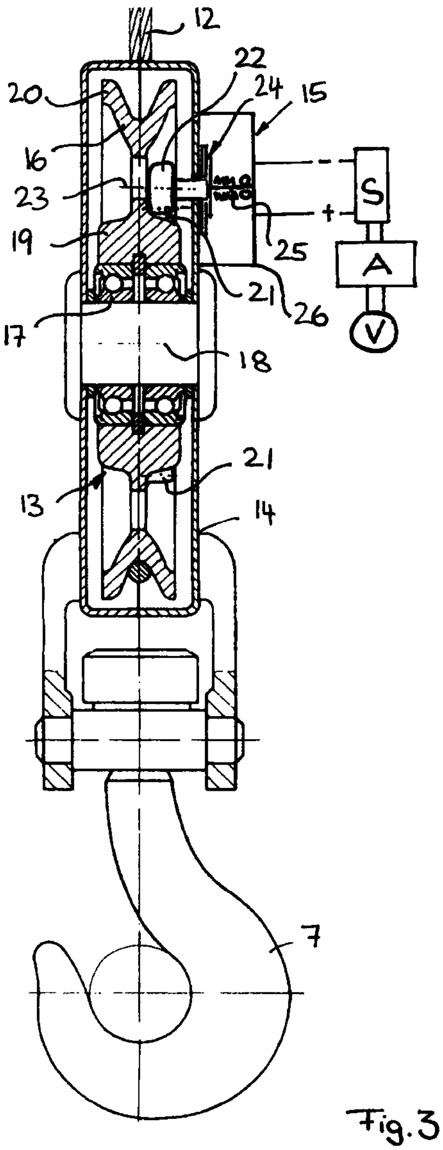
FIG. 3: a schematic sectional view of the lifting hook of the crane of the preceding Figures with the deflection pulley that is lashed thereto and that is provided with a ring gear via which the deflection pulley drives a generator that is fastened to the housing of the deflection pulley.

As FIG. 3 shows, the deflection pulley 13 about which the hoist rope 6 at the lifting hook 7 is deflected can comprise a roller body 16 that is rotatably supported via one or more roller bearings 17 at a roller axle 18 that is fastened to the pulley block carrier 14. The rotational axle 19 of the deflection pulley 13 extends here substantially perpendicular to the plane spanned by the hoist rope 12 and thus substantially horizontally. A widened or thickened bearing flange 19 of said roller body 12 can here be seated on said roller bearing 17, with generally, however, a different kind of bearing also being conceivable, for example a plain bearing or a rotatably supported axle.

On the other hand, said roller body 16 comprises at the outer margin a thickened rope flange 20 in which a rope groove is outwardly openly worked in which the deflected rope runs. An annular, thinner intermediate zone of the roller body 16 is provided between said bearing flange 19 and the likewise widened or thickened rope flange 20, cf. FIG. 3.

To drive the generator 15, a ring gear 21 with which a drive wheel 22 can be in rolling engagement can advantageously be provided at the roller body 16. Said ring gear 21 can here advantageously be provided at said bearing flange 19, for example in the form of an outer toothed arrangement.

Figure 4:
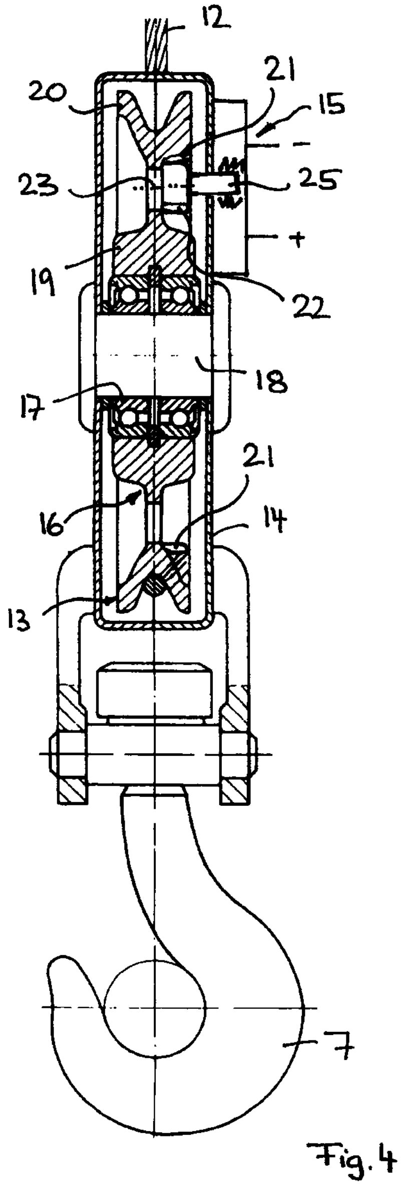
FIG. 4: a schematic sectional view of the lifting hook and of the deflection pulley lashed thereto similar to FIG. 3, with the generator again being driven by a ring gear at the deflection pulley, but in comparison with FIG. 3 not being arranged at the bearing flange of the deflection pulley, but rather at the flange of the deflection pulley at the outer circumferential side in which the rope pulley is worked.

As FIG. 4 shows, said ring gear 21 can, however, also be arranged at the rope flange 20, for example in the form of an inner toothed arrangement in the manner of an annulus gear.

Instead of a ring gear and a drive pinion meshing therewith, a friction track can, however, also be provided at the roller body 16 that can be formed analogously to the ring gear 21 at the bearing flange 19 and/or at the rope flange 20, for example in the form of an outer circumferential ring or an inner circumferential ring. When a friction track is provided, said drive wheel 22 can be a friction wheel.

As FIGS. 3 and 4 show, the drive wheel 22 can advantageously be arranged between the bearing and rope flanges 19, 20, in particular in the region of the thinned, annular connection section of the roller body 16, with the drive wheel 22 being able to be arranged at least partially within the width of the bearing flange 19 and/or of the rope flange 20 and being able to overlap—viewed in the radial direction toward the rotational axle of the deflection pulley 13—with said bearing flange 19 and/or rope flange 20. The drive wheel 22 can advantageously be completely received in the plate-shaped annular depression that is provided between the bearing flange 19 and the rope flange 20, cf. FIGS. 3 and 4.

Said drive wheel 22 can advantageously have a rotational axle 23 that can extend substantially in parallel with the rotational axle of the deflection pulley 13, with the rotational axle 23 of the drive wheel 22 being able to be spaced apart from the rotational axle of the deflection pulley 13.

As FIG. 3 shows, said drive wheel 22 can rotationally drive the generator axle or the rotor of the generator 15, with the generator axle being able to be directly connected to the drive wheel 22. Alternatively, a transmission section 24 can also be provided between the drive wheel 22 and the generator axle and can be formed as a spur gear section or as a planetary transmission section, but also as a bevel gear section or another transmission section or combinations thereof. The drive wheel 22 and/or the generator shaft 25 and/or the optionally interposed transmission section 24 can advantageously be supported at or fastened to the pulley block carrier 14, with being able to surround the coils and/or the magnet and/or the other functional components of the generator 15 at the generator housing 26. Said generator housing 26 can, for example, be attached to and/or formed by a pulley block housing, for example.

As FIG. 3 shows, the electric power provided by the generator 15 can be fed via power electronics and/or feed electronics S into an energy store such as a secondary cell or also a capacitor that serves as a buffer and from where the electric energy is then forwarded to a consumer V that can, for example, be a sensor, an actuator, a communication module, or a processor. A gripping harness attached to the lifting hook 7 and, for example, comprising a magnet or the like can be supplied, with other consumers, however, also being able to be considered such as already initially explained.

A position sensor can, for example, be provided at the lifting hook and can determine the position of the lifting hook relative to the crane structure and/or relative to objects to be acquired and is supplied with power from the generator 15. Alternatively or additionally, such a sensor can also be a motion sensor or an acceleration sensor to determine movements and/or accelerations of the lifting hook. A gyroscopic sensor can be provided, for example. In general, however, other sensors such as weighing or weight sensors can also be used and can be supplied with power from the generator.

A communication module can advantageously be connected to the respective sensor to transmit, preferably wirelessly, the sensor signal to a control device. The communication device can here advantageously comprise a radio module to transmit the sensor signal by radio.

Optionally, the electric power provided by the generator 15 can, however, also be provided to the consumer V without buffering in an energy store A.

The generator 15 can be formed as a DC power generator or also as an AC power generator.

Figure 5:
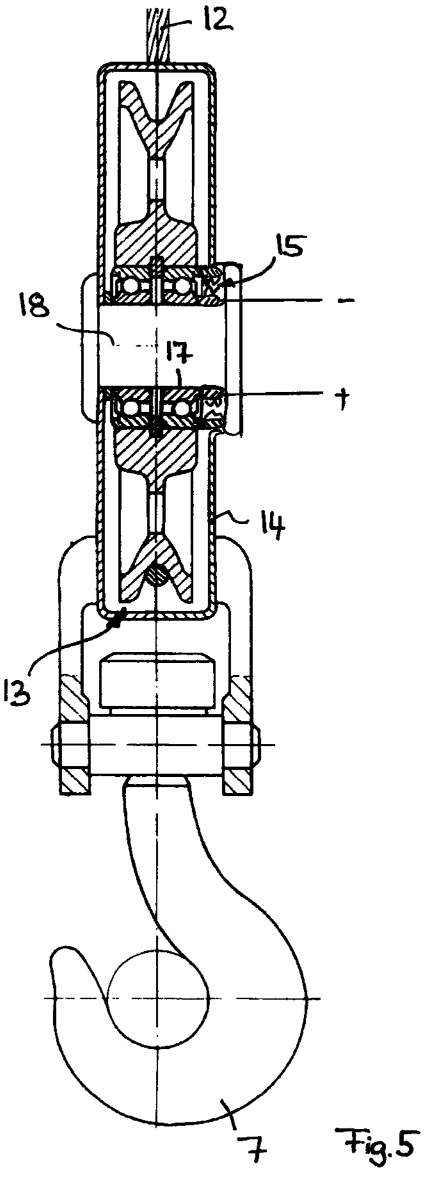
FIG. 5: a schematic sectional view of the lifting hook and of the deflection pulley arranged thereat, with the generator in this embodiment being integrated into the roller bearing via which the deflection pulley is rotatably supported at the roller axle.

As FIG. 5 shows, the generator 15 can also be directly integrated in the roller bearing 17 via which the deflection pulley 13—optionally also the roller 10 of the trolley 5 or the deflection pulley 13 provided there—is rotatably supported. For example, one of the roller bearing rings of the roller bearing 17 can be provided with an induction coil, while the other roller bearing ring can be provided with a magnetic rotor or a magnetic coil or can be formed as a magnetic rotor. The generator coil in which the power is generated can here advantageously be connected to the fixed position roller bearing ring, while the rotor is connected to the roller bearing ring that co-rotates with the roller.

Figure 6:
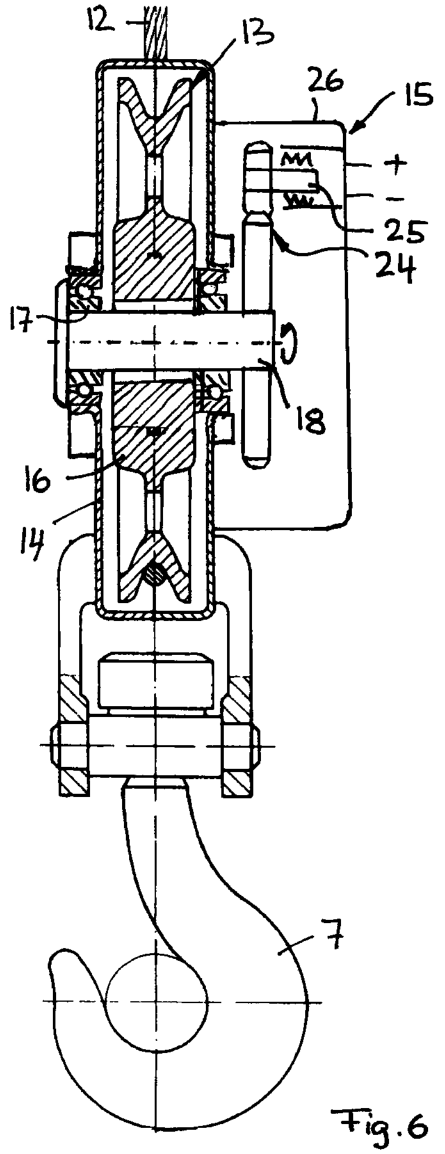
FIG. 6: a schematic sectional view of the lifting hook and of the deflection pulley connected thereto, with the deflection pulley being rotationally fixedly connected to a roller axle that co-rotates with the deflection pulley and drives the generator via a spur gear section in accordance with a further embodiment of the invention.

As FIG. 6 shows, the generator 15 can also be driven by the axle of the deflection pulley 13—or by the axle of the roller 10 or of the deflection pulley 11, with in this case the roller axle 18 being rotationally fixedly connected to the roller body 16 and co-rotating therewith. As FIG. 6 shows, the roller axle 18 can be rotatably supported at the pulley block carrier 14 via roller bearings 17.

The roller axle 18 driven by the roller body 16 can drive the generator shaft 15 or its rotor directly or via a transmission section 24, with said transmission section 24 being able to be a spur gear section, as FIG. 6 shows, but alternatively also being able to be formed as a planetary section or in another manner.

Figure 7:
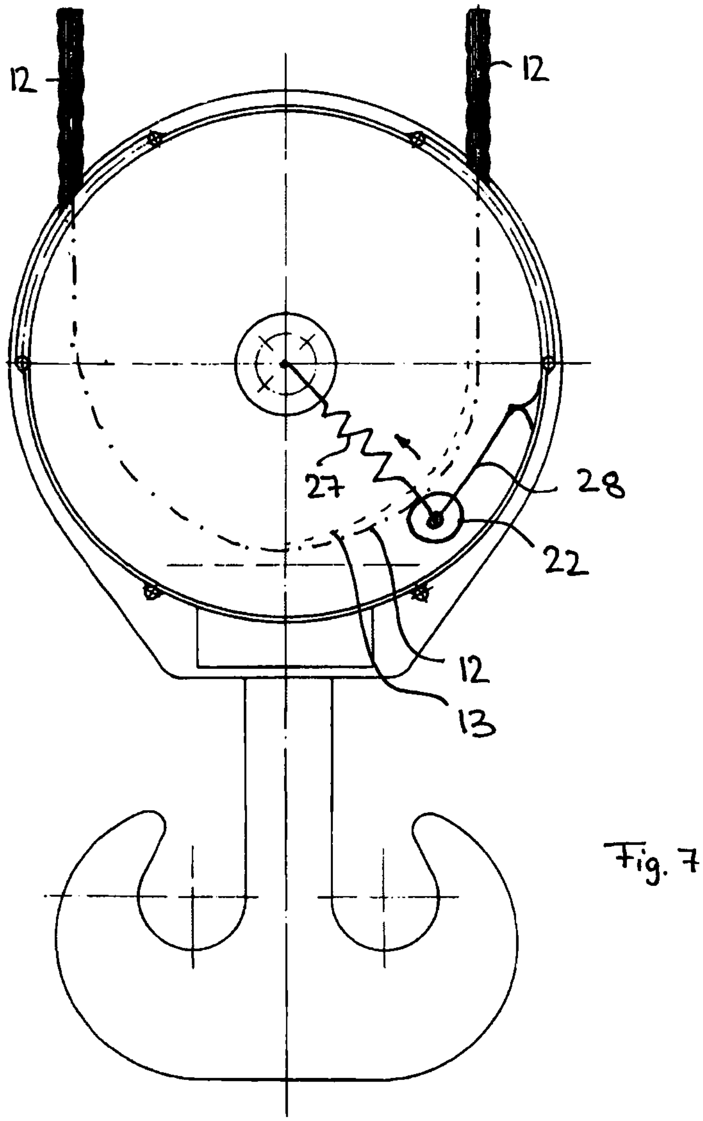
FIG. 7: a lateral plan view of the lifting hook and the deflection pulley connected thereto, with the generator being driven via a rope contact wheel that is arranged at the circumferential side at the deflection pulley and rolls off on the rope that is led around the deflection pulley in accordance with a further embodiment of the invention.
Figure 8:
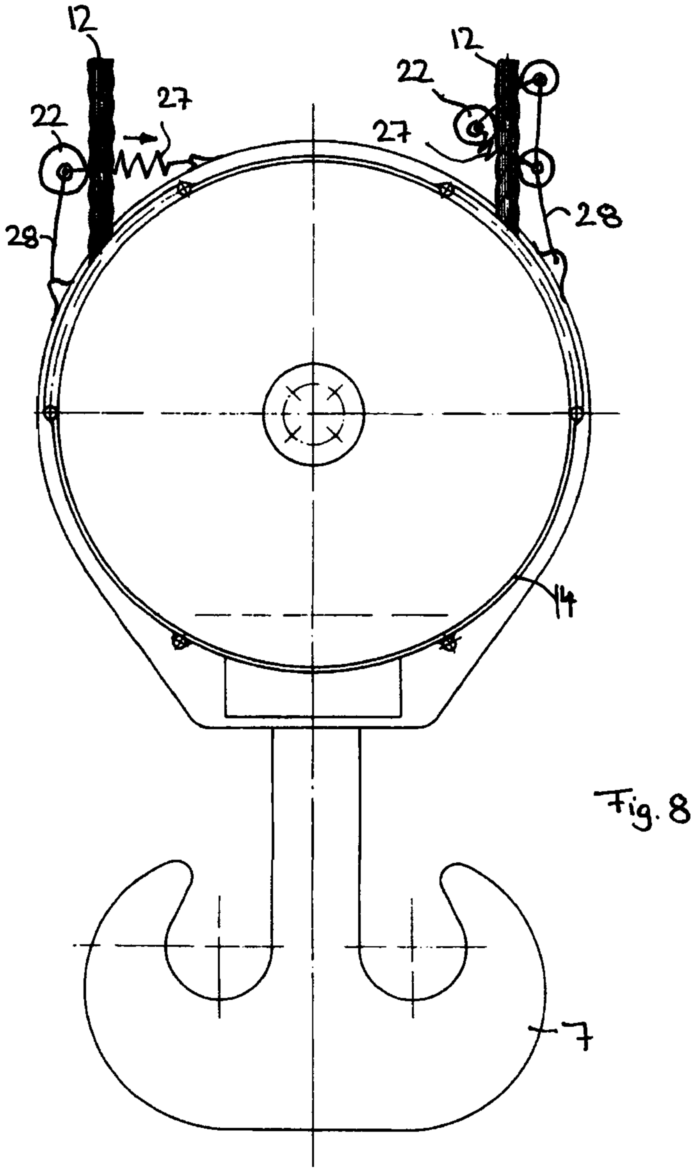
FIG. 8: a lateral plan view of the lifting hook and the deflection pulley connected thereto, with the generator being driven by a rope contact roller that rolls off on the rope section that runs on the deflection pulley or runs off from the deflection pulley, with different suspension devices or preloading devices being shown by means of which the rope contact wheel is pressed toward the rope.
Figure 9:
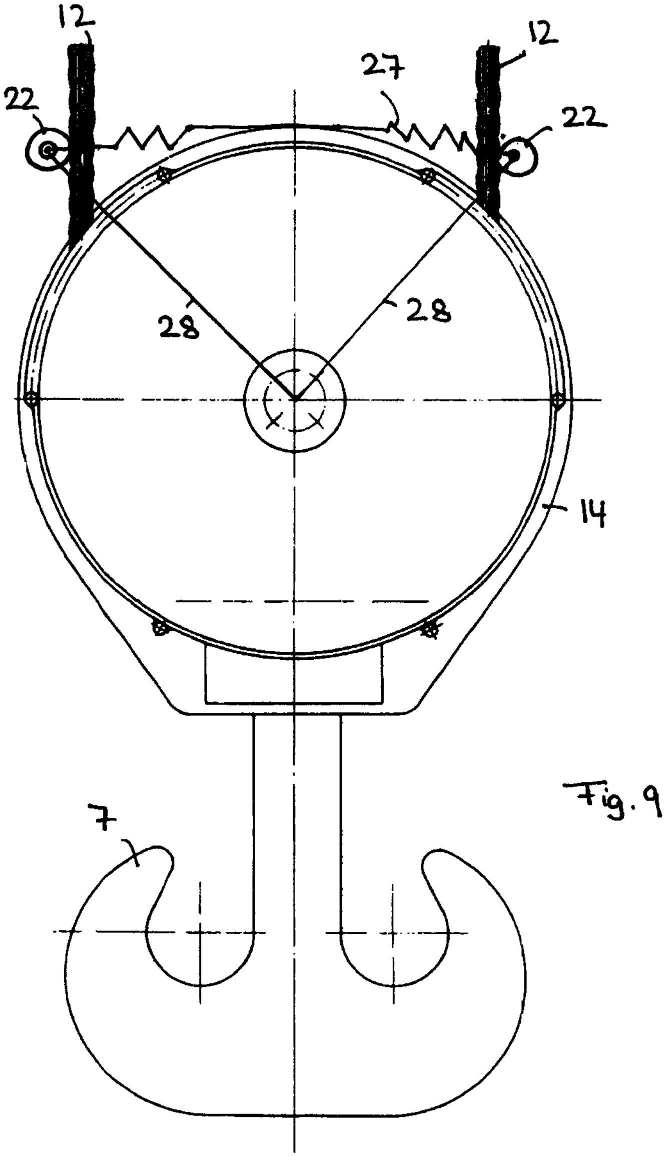
FIG. 9: a lateral plan view of the lifting hook and the deflection pulley connected thereto from the preceding Figures, with two rope contact wheels for driving the generator rolling off, on the one hand, on the rope section running in and, on the other hand, rolling off on the rope section running out and being tensioned against one another to be pressed toward the rope section.

As FIGS. 7 to 9 illustrate, the drive wheel 22 that drives the generator directly or via a transmission section 24, can also be formed as a rope contact wheel that can roll off on the hoist rope 12—or optionally also on the trolley cable 8—to convert the rope movement into a rotary drive movement.

As FIG. 7 shows, such a drive wheel 22 formed as a rope contact wheel can advantageously be arranged at the circumference of the deflection pulley 13 and can be in contact with a rope section, or can roll off thereon, that is deflected by the deflection pulley 13.

To achieve sufficient friction force or to ensure a secure rolling off of the drive wheel 22 ono the rope, the drive wheel 22 formed as a rope contact wheel can be pressed or tensioned toward the rope via a preload device 27 to increase the pressing forces. Said preload device 27 can, for example, comprise a spring device that pulls the rope contact wheel toward the rope transversely to the longitudinal rope direction.

Said rope contact wheel can be held at its position via an anchorage 28, for example in the form of a rocker that can move transversely to the longitudinal rope direction. The anchorage 28 can form a wheel suspension at which the rope contact wheel Is rotatably supported and that holds the rope contact wheel at the intended position at the rope.

As FIG. 7 shows, the drive wheel 22 formed as a rope contact wheel can advantageously be arranged in the interior of the pulley block carrier 14, in particular in an annular zone between the deflection pulley 13 and the outer wall of the housing of the pulley block carrier 14.

As FIG. 8 shows, a drive wheel 22 formed as a rope contact wheel can, however, also be arranged outside the pulley block carrier 14 and can be connected to the rope section that runs onto the deflection pulley or runs off therefrom. As FIG. 8 shows, a single drive wheel 22 can here be preloaded toward the rope by a preload device 27 transversely to the longitudinal rope direction and can be held in position by a wheel suspension 28, with the preload device 27 and/or the suspension 28 being able to be supported at the pulley block carrier 14. When such a rope contact wheel is provided at the trolley 5, the preload device 27 and/or the wheel suspension 28 can be supported at the trolley or at its frame.

As the right hand side of FIG. 8 shows, the drive wheel 22 formed as a rope contact wheel can, however, also be held at the rope or tensioned toward the rope via further rope contact wheels, with a preload device 27, for example comprising a spring device, also being able to ensure the contact pressure of the drive wheel 22 toward the rope and a wheel suspension or an anchorage 28 being able to support the plurality of rope contact wheels at the pulley block carrier 14—or analogously at the frame of the trolley 5.

The shown rope contact wheels can, analogously to the previously described embodiments, drive the generator shaft or the rotor of the generator 15 directly or via a transmission section 24.

Figure 10:
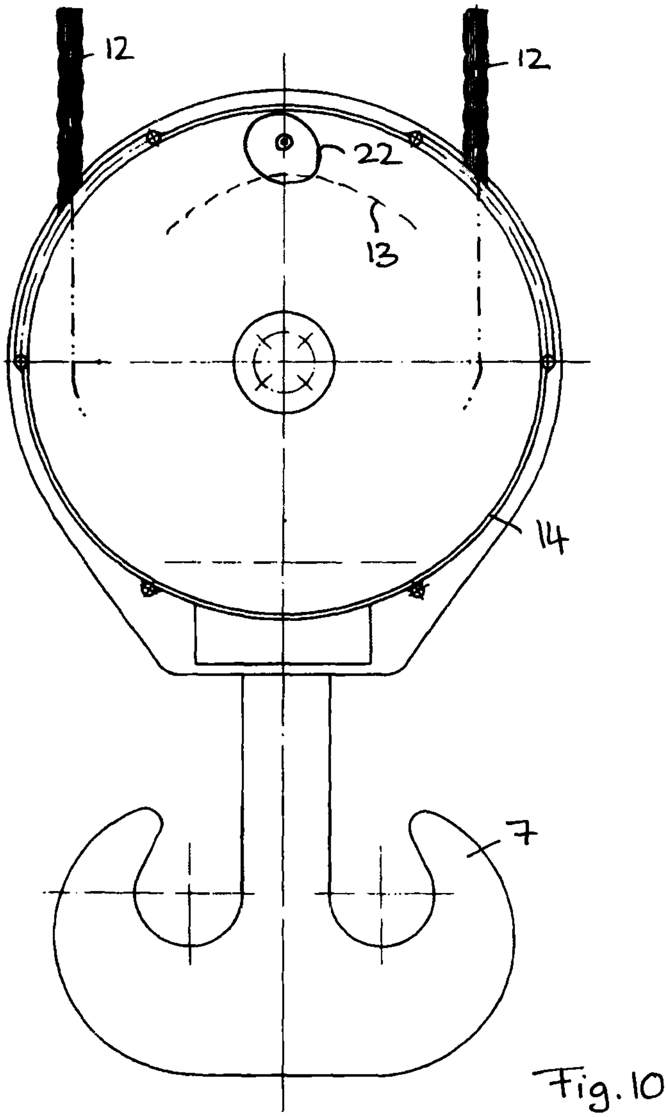
FIG. 10: a lateral plan view of the lifting hook and the deflection pulley similar to the preceding Figures, with a drive wheel for driving the generator running off on the outer circumferential side of the deflection pulley in a region in which the rope does not contact the deflection pulley.

As FIG. 10 shows, the drive wheel 22 can also roll off on the outer circumference of the deflection pulley 13, for example in the rope groove provided there, with in this case the drive wheel 22 advantageously being able to be directly supported at the pulley block carrier 14, advantageously in a section between the rope section that runs off and the rope section that runs in and in which the deflection pulley 13 does not contact the rope.

We claim:

1. A crane comprising:

a crane boom from which a lifting hook is raisable and lowerable can be raised and lowered via a hoist rope;

an electric power supply at the lifting hook comprising a generator having a generator axle;

a drive wheel directly attached to the generator axle in a rotationally fixed manner;

a deflection pulley around which the hoist rope is deflected; and a rope flange in which an outwardly open rope groove, in which a deflected portion of the hoist rope runs, divides an outer circumferential side of the rope flange into two rope flange parts located on the left and right side of the open rope groove in a direction parallel to a rotational axle of the deflection pulley, wherein the drive wheel comprises a friction wheel, wherein the rope flange is widened to form a friction track on one of the two rope flange parts on the outer circumferential side of the deflection pulley, and wherein the drive wheel is in contact with and driven by the friction track.

2. The crane of claim 1, wherein a rotatory axis of the drive wheel is parallel to a rotatory axis of the deflection pulley.

3. The crane of claim 1, wherein an outer circumferential side of the drive wheel contacts the friction track.

4. The crane of claim 1, wherein the friction wheel is positioned in a sector at the deflection pulley in which the deflection pulley does not contact the rope.

5. The crane of claim 1, wherein the drive wheel is in contact with and driven by the friction track such that the generator is drivable by the drive wheel.

6. The crane of claim 1, wherein the generator axle and the rotational axle of the deflection pulley comprise rotational axles that are at least approximately in parallel with one another.

* * * * *